(No Model.)

W. I. MANN.
HOSE AND PIPE COUPLING.

No. 270,323. Patented Jan. 9, 1883.

Witnesses:
F. G. Pollock.
G. Smith.

William I. Mann,
by Connolly Bros & McTighe

UNITED STATES PATENT OFFICE.

WILLIAM I. MANN, OF BRADDOCK, PENNSYLVANIA.

HOSE AND PIPE COUPLING.

SPECIFICATION forming part of Letters Patent No. 270,323, dated January 9, 1883.

Application filed August 25, 1882. (No model.)

*To all whom it may concern:*

Be it known that I, WILLIAM I. MANN, of Braddock, in the county of Allegheny and State of Pennsylvania, have invented certain new and useful Improvements in Hose and Pipe Couplings; and I do hereby declare that the following is a full, clear, and exact description of the invention, which will enable others skilled in the art to which it appertains to make and use the same, reference being had to the accompanying drawings, which form a part of this specification, in which—

Figure 1:
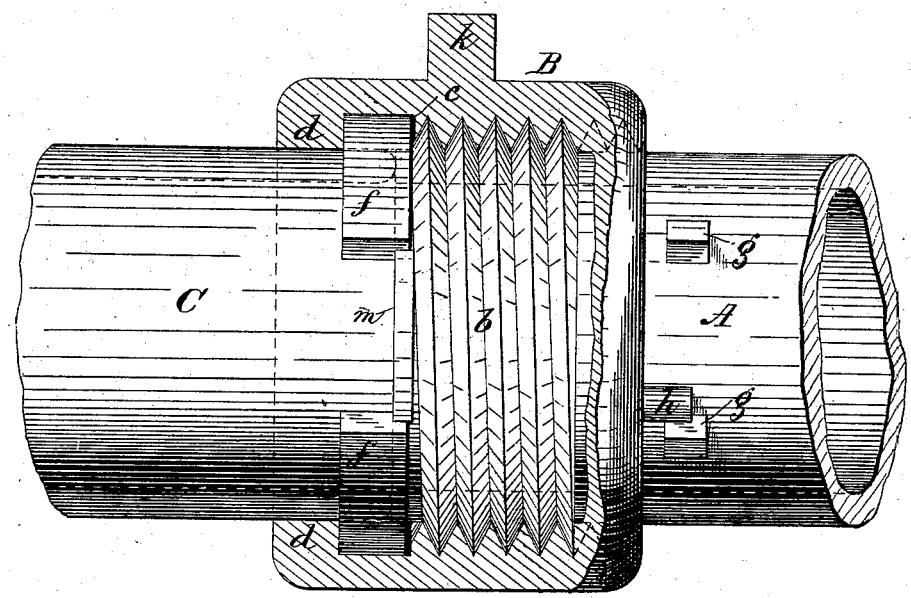
Figure 2:
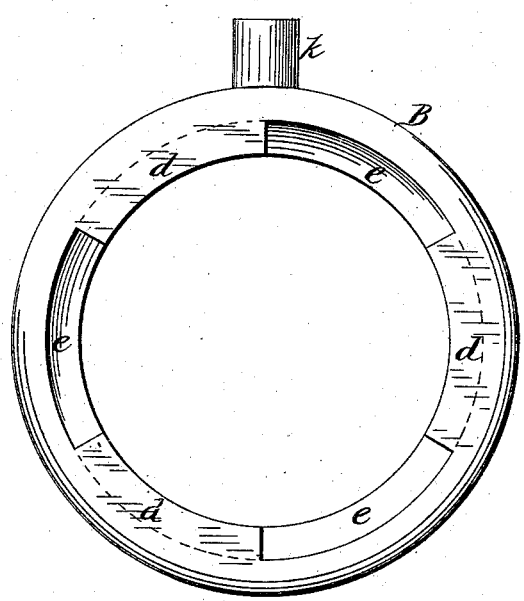

Figure 1 is a view of the adjoining ends of two pipe sections or couplings, with the tightening-nut partly in section. Fig. 2 is an end view of the nut.

This invention relates to the construction of pipe-couplings, and has for its object the production of a device which shall be cheap and easily made, and shall enable the sections of pipe to be readily coupled and uncoupled, and when in use make and preserve a tight joint.

The invention consists in the construction and combination of parts, substantially as hereinafter described and claimed.

In the drawings, A and C are the respective sections of the coupling device. Section A has its coupling end trued off or faced, and back of this is formed with a coarse screw-thread, $b$. Upon this plays the nut B, threaded to correspond.

Beyond the threaded part of nut B, I construct an annular recess, $c$, ending with the inwardly-projecting lugs $d$, arranged equidistantly around the circumference of the nut, and leaving equal spaces $e$ between them. The inner face of the collars or lugs $d$ is trued off to a common plane. The other coupling-section, C, has its end faced off, and is provided around that end with the equidistant lugs $f$, each corresponding in size with the spaces $e$ between the lugs $d$ of the nut B. The lugs $f$ are somewhat shorter than the recess $c$ of the nut, and have their rear ends or faces trued off to a common plane, as shown, and their radial height is such as to enter and revolve in recess $c$ of nut B.

In setting the nut for coupling it is adjusted so as to have the recess formed between lugs $d$ and the end of section A slightly greater than the length of lugs $f$ of section C. Section C is then set so that its lugs $f$ correspond with spaces $e$ of the nut, whereupon it is pushed into the nut until the plane ends of the two sections meet, after which a partial revolution of nut B causes its lugs $d$ to pass behind the lugs $f$ of section C, and the screw-thread then forces the sections into close contact, making an extremely tight junction. To uncouple, the nut B is turned in the opposite direction a part of a revolution till the spaces $e$ of nut B correspond with the lugs $f$ of section C, when the two can be separated. In use the nut B is never removed from the section A. In the drawings I have shown on nut B three lugs and three spaces, and the same on section C. Thus made, one-sixth of a revolution of nut B suffices to couple or uncouple; but the parts can be made with two lugs each and two spaces, which will require one-fourth of a revolution to couple and uncouple.

To facilitate the setting I place on the section A two lugs, $g$, a little over a sixth of the circumference apart, and on the end of nut B a pin, $h$, so set as to strike the lugs $g$ at the limits of motion required for the nut B. A pin, $k$, for a spanner-wrench is made on nut B; or, instead, a handle may be fitted to it.

The faces of the sections A C may be made true enough to fit water-tight; or a gasket may be used between them.

To prevent the sections A C or either of them from revolving while operating the nut, I make a slight projection on one of them, as at $m$, which fits a corresponding recess on the other, so that when the parts A C are pushed together the projection $m$ will lock both parts against revolution separately.

I claim as my invention—

1. In a pipe-coupling, the combination of the section A, having thread $b$, threaded nut B, having recess $c$ and two or more overhanging equidistant lugs, $d$, and section C, having equidistant lugs $f$, corresponding to the spaces between lugs $d$ of the nut, and adapted to pass through the spaces between the lugs $d$ and engage with the latter on a partial revolution of the nut, substantially as described.

2. In a pipe-coupling, the combination of section A, having thread $b$, threaded nut B, having recess $c$ and two or more overhanging equidistant lugs $d$, and sections C, having equidistant lugs $f$, corresponding to the spaces between lugs $d$ of the nut, both said sections A C having their adjacent ends faced true, but one provided with a projection and the other with a recess, substantially as described, whereby when set together said sections are locked against separate revolution.

3. The combination of section C, having lugs $f$, threaded nut B, having recess $c$ and lugs $d$, and pin $h$, with section A, having thread $b$ and lugs $g$ $g$, substantially as described.

4. In a pipe or hose coupling, the nut B, having slots $e$ and recess $c$, in combination with the coupling-section C, having the corresponding lugs, $d$, adapted to pass through said slots and engage the outer edge of said recess upon a partial revolution of the nut, substantially as specified, and for the purpose set forth.

In testimony that I claim the foregoing as my own I have hereto affixed my signature in presence of two witnesses.

WILLIAM I. MANN.

Witnesses:
T. J. PATTERSON,
T. J. McTIGHE.